United States Patent [19]

Daniylchev

[11] Patent Number: 5,666,640
[45] Date of Patent: Sep. 9, 1997

[54] MICROWAVE POWERED OZONE PRODUCING SYSTEM

[76] Inventor: Vladimir A. Daniylchev, 4501 Pinyon Tree La., Irvine, Calif. 92715

[21] Appl. No.: 626,470

[22] Filed: Apr. 2, 1996

[51] Int. Cl.$^6$ ............................................. B01J 19/12
[52] U.S. Cl. ............................ 432/186.1; 422/186.11
[58] Field of Search ......................... 422/186.07, 186.11, 422/186.1

[56] References Cited

U.S. PATENT DOCUMENTS

| | | |
|---|---|---|
| 3,872,349 | 3/1975 | Spero et al. . |
| 3,911,318 | 10/1975 | Spero et al. . |
| 3,983,039 | 9/1976 | Eastland . |
| 4,042,850 | 8/1977 | Ury et al. . |
| 4,208,587 | 6/1980 | Eastlund et al. . |
| 4,269,581 | 5/1981 | Ury et al. . |
| 4,313,969 | 2/1982 | Matthews et al. . |
| 4,359,668 | 11/1982 | Ury . |
| 5,039,918 | 8/1991 | Ohtake et al. ................ 315/248 |
| 5,503,807 | 4/1996 | Griffiths et al. .......... 422/186.04 |

*Primary Examiner*—Charles T. Jordan
*Assistant Examiner*—John R. Hardee
*Attorney, Agent, or Firm*—Stetina Brunda & Buyan

[57] ABSTRACT

A microwave powered ozone producing system comprising a housing defining a microwave cavity having a volume Vo, an inlet and exhaust ports which communicate with the microwave cavity. Disposed within the microwave cavity and uniformly distributed therewithin are a number N of ozone producing lamps, each of which has a diameter D, a length L, and a nominal power p. Communicating with the microwave cavity is a microwave magnetron generator having a microwave power P and producing microwaves having a wavelength $\lambda$. Electrically connected to the generator is a power supply. The optimal operating condition for the system to maximize the ultraviolet output and longevity of the lamps and minimize system power consumption is governed by the relationships:

Vo$\geq$V min 1 wherein V min 1=8 $\pi\lambda^3/3$;

Vo$\geq$V min 2 wherein V min 2=$\pi(D+1)^2$ N L/4; and $$P = kNp\sqrt{1 + Vo/V\min}$$

wherein V min is the larger of V min 1 and V min 2, and k is a constant with a value in the range of 0.3$\leq$k$\leq$3, and $\pi$=3.14.

34 Claims, 3 Drawing Sheets

MICROWAVE POWERED OZONE PRODUCING SYSTEM

FIELD OF THE INVENTION

The present invention relates generally to the production of ozone, and more particularly to an ozone producing system wherein a relatively large number of ozone producing lamps are simultaneously and uniformly powered by microwave energy in a compact, highly energy efficient unit which is economical to manufacture. The system constructed in accordance with the present invention is adapted to produce very clean ozone for a wide variety of applications, while being more compact and consuming a lower levels of energy than in prior art ozone generating systems.

BACKGROUND OF THE INVENTION

Ozone is currently used in many European countries for purposes of water purification, and is used worldwide for purposes of sterilization in environments such as hospitals, movie theaters, and fitness centers. In the prior art, large volumes of ozone are typically produced through the use of corona discharge generators wherein a corona is discharged into pure oxygen. These generators require the use of pure oxygen, in that the discharge of a corona into air facilitates the creation of equal quantities of ozone and poisonous nitrogen dioxide which, if mixed with water vapor, creates nitric acid. As such, prior art corona discharge generators for producing large volumes of ozone require the use of auxiliary systems which produce pure oxygen from air, to provide a constant source of pure oxygen. As will be recognized, the use of the prior art corona discharge generators is extremely costly and inefficient in view of the requirement that pure oxygen be used therewith.

In view of the shortcomings associated with the use of corona discharge generators, there has also been developed in the prior art a method of producing more clean and pure ozone through the use of ultraviolet radiation having wavelengths below 220 nm. In prior art systems using this alternative ozone production method, the ultraviolet radiation is generated through the use of low-pressure mercury lamps powered with AC voltage through common fluorescent ballasts. Examples of these types of ultraviolet radiation ozone generating systems are disclosed in U.S. Pat. Nos. 2,042,963; 2,088,544; and 5,387,400. Though these systems present advantages over the corona discharge generators they also possess certain deficiencies which detract from their overall utility. Such deficiencies include the a very large size due to the need to include a separate ballast for each mercury lamp, and the high power consumption associated with the inclusion of many ballasts.

It has also been determined in the prior art that the efficiency of excitation of electric discharge in a mercury lamp can be increased up to two times by replacing the AC or DC excitation with microwave excitation. In addition to increasing discharge efficiency, the use of microwave excitation also eliminates the need for the ballasts to power each of the individual mercury lamps. The use of microwaves to power efficient, medium pressure mercury lamps is disclosed in U.S. Pat. Nos. 3,872,349; 3,911,318; and 4,042,850. In these particular references, microwave cavities are used in conjunction with microwave powered deep ultraviolet light sources. However, the microwave cavities disclosed in these references operate on fundamental or near fundamental cavity modes. These type of mode structures make it impossible to simultaneously excite a large number of lamps uniformly due to the inclusion of a very clearly defined, non-homogeneous standing wave electric field distribution inside the microwave cavity. Though the multi-mode cavities widely used in conventional microwave ovens provide homogeneous electric field distribution inside the cavity, they do not provide the critical optimal electric field strength absolutely necessary for the efficient excitation of low pressure mercury lamps for the efficient generation of ozone.

The present invention overcomes the deficiencies associated with the prior art by defining the critical conditions which interrelate the geometry of the microwave cavity, the individual lamp dimensions, the microwave cavity volume, and the microwave power of the magnetron generator for the efficient, homogenous excitation in the same microwave cavity of from one to thousands of ozone producing lamps. In the present invention, clean and pure ozone is generated with up to two times less energy consumption than prior art AC/DC mercury lamp ozone generators including the same number of lamps. In this respect, the present invention provides a powerful, compact, low-cost and reliable ultraviolet ozone generator for the production of clean ozone, free from nitrogen oxides, using standard, ozone producing lamps.

SUMMARY OF THE INVENTION

In accordance with the preferred embodiment of the present invention, there is provided a microwave powered ozone producing system. The system comprises a housing which defines a microwave cavity having a volume $V_o$. Fluidly communicating with the microwave cavity are separate inlet and exhaust ports. Disposed within the microwave cavity and uniformly distributed therewithin are a number N of ozone producing lamps, each of which has a diameter D, a length L, and a nominal power p. Additionally, communicating with the microwave cavity is a microwave magnetron generator having a microwave power P and producing microwaves having a wavelength $\lambda$. Electrically connected to the generator is a power supply. In the preferred embodiment, the optimal operating condition for the system to maximize the ultraviolet output and longevity of the lamps and minimize system power consumption is governed by the relationships:

| | |
|---|---|
| $V_o \geq V_{min}\ 1$ wherein $V_{min}\ 1 = 8\pi\lambda^3/3$ | [formula (1)] |
| $V_o \geq V_{min}\ 2$ wherein $V_{min}\ 2 = \pi(D+1)^2 NL/4$ | [formula (2)] |
| $P = kNp\sqrt{1 + V_o/V_{min}}$ | [formula (3)] | wherein V min is the larger of V min 1 and V min 2, and k is a constant with a value in the range of $0.3 \leq k \leq 3$ (low values of k are used in the case of extended lamp life time, while high values of k are used in the case of highest power and ozone production rate). In formulas (1), (2), and (3), the units for $\lambda$, D, and L are in cm; the units for Vo, V min, V min 1, and V min 2 are in cm$^3$; the units for P and p are in watts; and $\pi = 3.14$.

In the preferred embodiment, the microwave cavity itself is defined by first and second plates which are disposed within the housing in spaced relation to each other, and a side wall portion of the housing which extends between the first and second plates. In this respect, the inlet port communicates with the first plate, with the exhaust port communicating with the side wall portion of the housing. Importantly, the exhaust port is dimensioned so as to prevent the escape of microwaves from within the microwave cavity.

Additionally, the first plate is preferably perforated so as to facilitate the flow of a fluid from the inlet port into the microwave cavity. To maintain the cleanliness of the fluid circulated through the microwave cavity, a dust filter is disposed within the housing between the inlet port and the first plate, and is preferably applied to the first plate. To facilitate the passage of the fluid through the system (i.e., from the inlet port, through the microwave cavity, and out the exhaust port), a circulation fan is also disposed within the housing between the first plate and the inlet port.

The ozone producing lamps disposed within the microwave cavity are preferably supported therewithin by a support structure. The support structure itself comprises a top plate which is disposed within the microwave cavity and has a first set of openings and a first set of apertures disposed therein. In addition to the top plate, the support structure includes a bottom plate which is also disposed within the microwave cavity in spaced relation to the top plate. The bottom plate itself includes a second set of openings and a second set of apertures disposed therein. The top and bottom plates are oriented within the microwave cavity such that the openings of the first set are coaxially aligned with respective openings of the second set, with the lamps being extended between respective aligned pairs of the openings. The first and second sets of apertures disposed within the top and bottom plates are used to facilitate the circulation of a fluid through the microwave cavity. The top and bottom plates are each preferably fabricated from a dielectric, ozone resistant plastic material such as a polyethylene or a polytetrafluoroethylene.

In the ozone producing system of the present invention, the lamps preferably comprise either low or medium pressure mercury lamps, excimer lamps, hydrogen lamps, or deuterium lamps. These particular types of lamps may include hot cathodes, cold cathodes, or no electrodes. Each of the lamps has a preferred nominal power p of from 4 to 4000 watts. Additionally, the lamps each include an envelope which is preferably fabricated from quartz, sapphire, or fused silica, and is adapted to transmit ultraviolet radiation in the range of 160 num to 200 nm.

In the preferred embodiment, the microwave magnetron generator communicates with the microwave cavity directly or via a wave guide. The wave guide extends between the generator and the second plate defining the microwave cavity, with both the generator and the wave guide being disposed within the housing.

The power supply of the ozone producing system preferably comprises a high voltage transformer having a rectifier and a high voltage capacitor electrically connected thereto. The components comprising the power supply are also disposed within the housing, as is a cooling fan for cooling both the high voltage transformer of the power supply and the generator. The preferred power supply is adapted to function in a continuous wave or a repetitive pulse mode, and is operated with either an AC or DC external power source. The microwave magnetron generator is itself adapted to produce microwaves having a wavelength in the range of 890 mc/sec to 22250 mc/sec, and may comprise one or more magnetrons.

In the ozone producing system constructed in accordance with the present invention, a microwave disbursement unit is preferably disposed within the microwave cavity for evenly disbursing microwaves therewithin. Additionally, the side wall portion of the housing which partially defines the microwave cavity is preferably fabricated from ozone resistive metal or metal having an inner surface which includes an ozone resistive coating applied thereto. The ozone resistive metal or ozone resistive coating applied to the inner surface of the metal has a preferred electrical specific resistivity of from 2 to 80 micro ohms per centimeter. The microwave cavity preferably has a generally rectangular configuration, though the same may alternatively have a generally cylindrical configuration or an oval shape. The housing of the system is preferably fabricated from either metal or plastic.

Further in accordance with the present invention, there is provided a method of producing ozone which comprises the initial step of providing a housing which defines a microwave cavity having a volume Vo, and includes inlet and exhaust ports which communicate with the microwave cavity. Thereafter, a number N of ozone producing lamps are uniformly distributed within the microwave cavity, with each of the lamps having a diameter D, a length L, and a nominal power p. A microwave magnetron generator is then placed into communication with the microwave cavity, with the generator having a microwave power P and producing microwaves having a wavelength $\lambda$. Thereafter, a power supply is electrically connected to the generator, with a fluid then being circulated through the microwave cavity via the inlet and exhaust ports of the housing. The circulated fluid may comprise either pure oxygen or air.

The preferred method further includes the step of maximizing the ultraviolet output and longevity of the lamps and minimizing system power consumption by selecting the dimensions and functional attributes of the microwave cavity, the lamps, and the generator in accordance with the relationships:

$Vo \geq Vmin\ 1$ wherein $Vmin\ 1 = 8\pi\lambda^3/3$     [formula (1)]

$Vo \geq Vmin\ 2$ wherein $Vmin\ 2 = \pi(D + 1)^2 NL/4$     [formula (2)]

$P = kNp \sqrt{1 + Vo/V_{min}}$     [formula (3)]

wherein V min is the larger of V min 1 and V min 2, k is a constant with a value in the range of $0.3 \leq k \leq 3$, and $\pi = 3.14$.

The microwave powered ozone producing system of the present invention constitutes a significant improvement over prior art ozone generating systems in view of the reduced operational costs associated therewith. This reduction in operating expenses is attributable to the low energy consumption of the system, and the increased longevity of the ozone producing lamps therewithin. The relatively compact size and high reliability of the present system allows the same to be quickly and easily installed into existing airflow ducts within systems wherein the use of ozone is desired. The ability to produce ozone from air rather than pure oxygen also reduces the operational costs of the present system which produces relatively inexpensive, clean ozone which is free from nitrogen oxides. Though the present system finds maximum utility in relation to production of ozone for use in water purification or other sterilization systems, it will be recognized that the same may be used in other applications unrelated to the production of ozone.

BRIEF DESCRIPTION OF THE DRAWINGS

These, as well as other features of the present invention, will become more apparent upon reference to the drawings wherein.

DETAILED DESCRIPTION OF THE PREFERRED EMBODIMENT

Figure 1:
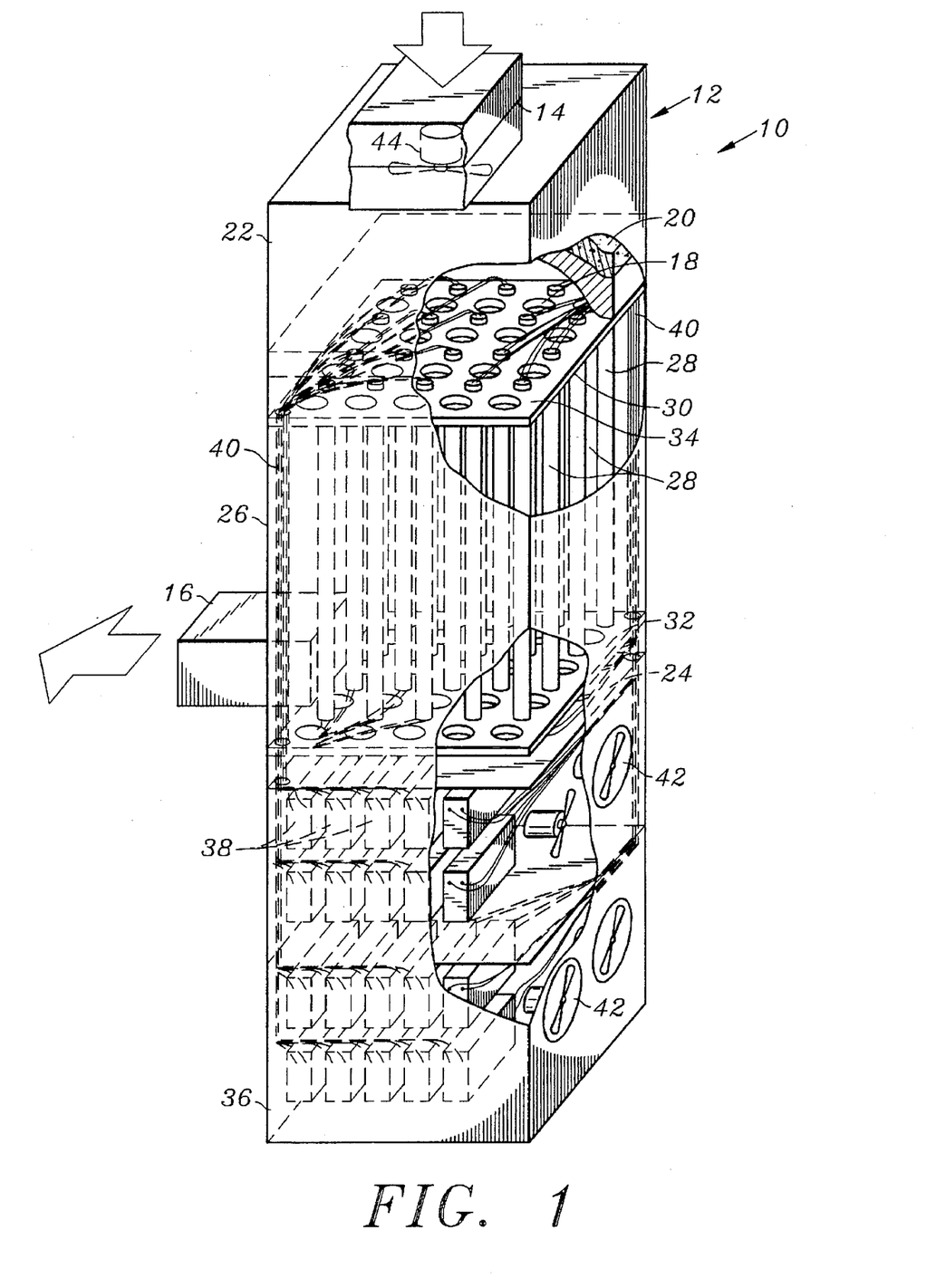
FIG. 1 is a perspective view of a prior art ozone generating apparatus.

Referring now to the drawings wherein the showings are for purposes of illustrating a preferred embodiment of the present invention only, and not for purposes of limiting the same, FIG. 1 perspectively illustrates an ultraviolet ozone producing apparatus 10 constructed in accordance with the prior art. The prior art apparatus 10 generally comprises a hollow housing 12 which includes an inlet port 14 and exhaust port 16. Disposed within the housing 12 in relative close proximity to the inlet port 14 is a grid-like support structure 18. Disposed between the support structure 18 and the inlet port 14 is a dust filter 20. Defined between the filter 20 and the inlet port 14 is an open gap or space which defines an entrance chamber 22 of the apparatus 10.

Also disposed within the housing 12 below the exhaust port 16 is a wall 24 which is typically fabricated from germetic metal or plastic. The space defined within the housing 12 between the support structure 18 and the wall 24 constitutes an ozone chamber 26 of the prior art apparatus 10. Disposed within the ozone chamber 26 are a plurality of ozone producing lamps 28, each of which has either two (2) electrical leads (i.e., a cold cathode lamp) or four (4) electrical leads (i.e., a hot cathode lamp). The lamps 28 are supported within the ozone chamber 26 by a top holder 30 which is disposed in close proximity to the support structure 18, and a bottom holder 32 which is disposed in close proximity to the wall 24. Disposed within the top and bottom holders 30, 32 are apertures 34 which are used to facilitate the circulation of ambient air through the ozone chamber 26. The exhaust port 16 communicates with the ozone chamber 26, with the extension of the lamps 28 between the top and bottom holders 30, 32 forming a lamp array which is also disposed therewithin.

The space defined within the housing 12 between the wall 24 and the bottom of the housing 12 constitutes a ballast chamber 36 of the apparatus 10. Disposed within the ballast chamber 36 are a plurality of ballasts 38. The ballasts 38 are electrically connected to respective ones of the lamps 28 via wire cables 40 which extend between the ballasts 38 and the electrical leads disposed on the opposed ends of the lamps 28. The apparatus 10 includes one ballast 38 for each lamp 28 disposed within the ozone chamber 26. Also disposed within the ballast chamber 26 and communicating with ambient air are a plurality of cooling fans 42 which are used to cool the ballasts 38 when the same are energized.

The prior art ozone producing apparatus 10 is operated by drawing air into the inlet port 14 through the activation of a fan 44 disposed within the entrance chamber 22 adjacent the inlet port 14. The air is circulated from the entrance chamber 22 through the dust filter 20 and support structure 18 into the ozone chamber 26. Due to the inclusion of the apertures 34 within the top and bottom holders 30, 32, the air freely circulates through the ozone chamber 26, with the emission of ultraviolet radiation from the lamps 28 facilitating the production of ozone which is discharged from the exhaust port 16. Though not shown, the ballasts 38 must each be electrically connected to a power supply or AC electrical net which is disposed outside the housing 12 of the apparatus 10.

Though, as previously explained, the prior art ozone producing 10 presents advantages over the prior art corona discharge generators, the same still possesses certain deficiencies which detract from its overall utility. In this respect, due to the necessity of including numerous ballasts 38 (i.e., one for each lamps 28), the apparatus 10 has a relatively large size and is costly to manufacture. Additionally, the numerous ballasts 38 cause the apparatus 10 to have a high rate of power consumption. In addition to the high power consumption, the use of the ballasts 38 to power the lamps 28 (i.e., AC or DC excitation) provides substantially less than maximum excitation efficiency of the lamps 28, thus further degrading the performance of the apparatus 10 and increasing the operational costs thereof.

As will be discussed in more detail below, the present invention overcomes the deficiencies of the prior art ozone producing apparatus 10 by, among other things, eliminating the need for the ballasts 38 through the use of microwave excitation for the lamps thereof. In addition to reducing the overall size of the system, the use of microwave excitation also increases the efficiency of the lamp discharge by up to two times. Thus, the system constructed in accordance with the present invention facilitates the production of ozone in a significantly more energy efficient and low cost manner than in the prior art.

Figure 2:
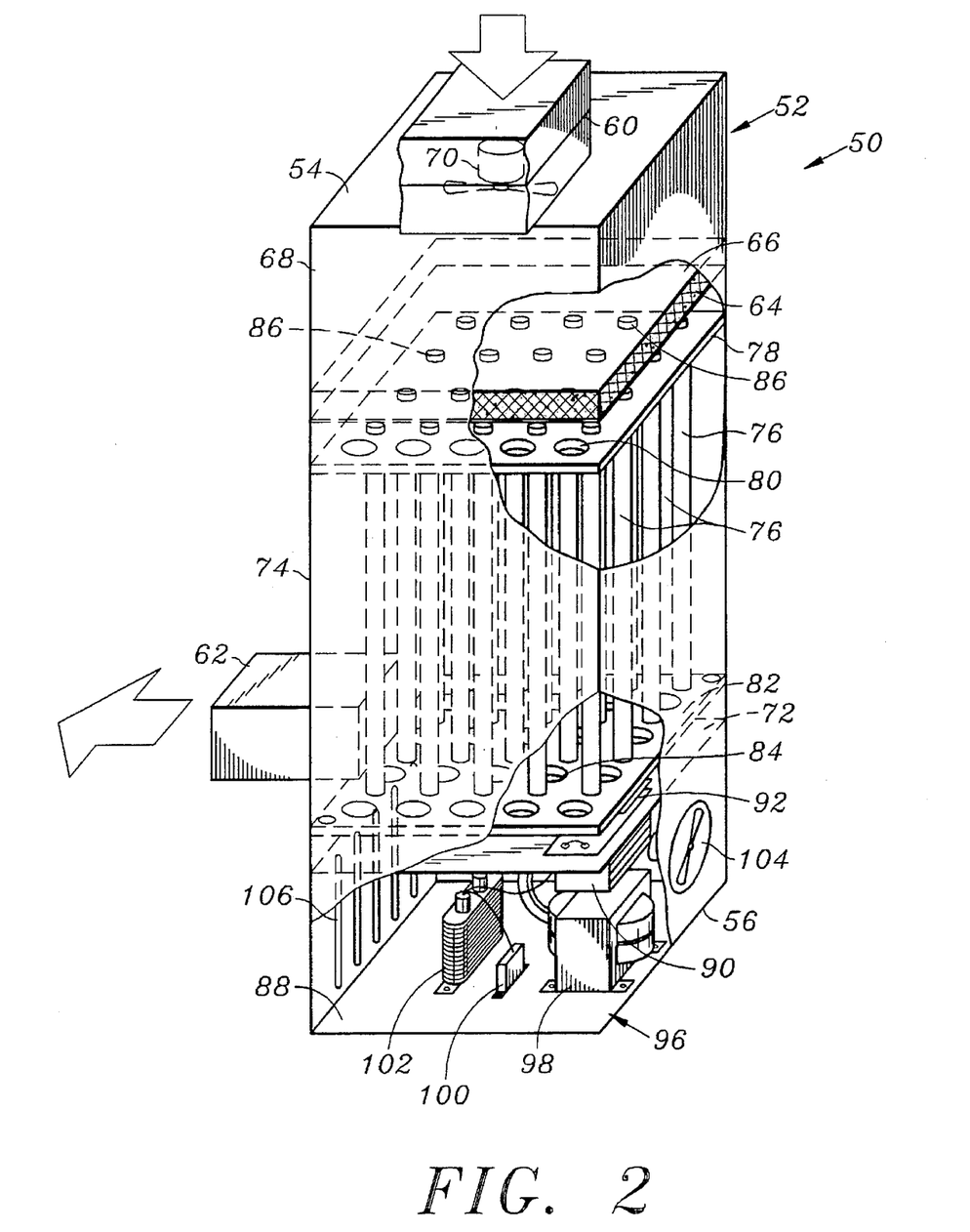
FIG. 2 is a perspective view of the microwave powered ozone producing system constructed in accordance with the present invention.
Figure 3:
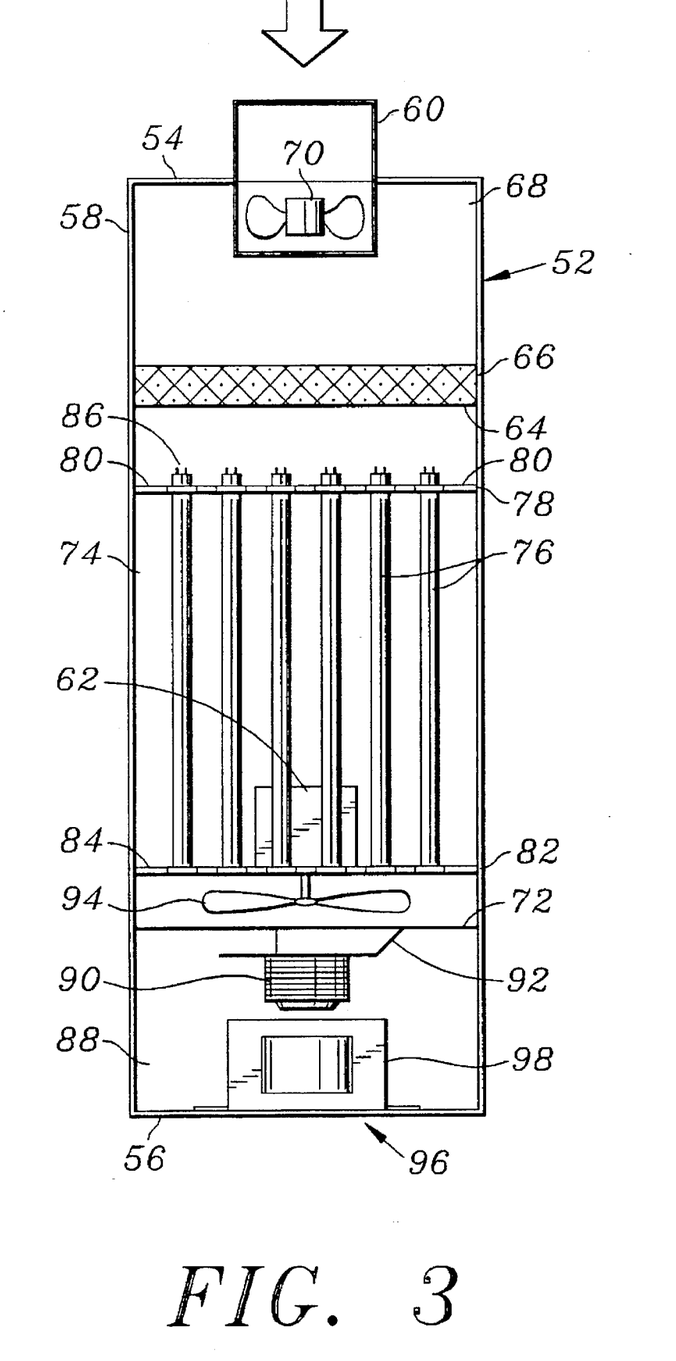
FIG. 3 is a side elevational view of the ozone producing system shown in FIG. 2.

Referring now to FIGS. 2 and 3, illustrated is an ozone producing system 50 constructed in accordance with a preferred embodiment of the present invention. The system 50 comprises a hollow housing 52 which includes a top end 54, a bottom end 56 and four (4) side walls 58. In the system 50, the housing 52 is typically vertically oriented, though it will be recognized that the same may be positioned in alternative orientations. Disposed within the top end 54 of the housing 52 is an inlet port 60, while disposed within one of the side walls 58 is an exhaust port 62. Both the inlet and exhaust ports 60, 62 communicate with the interior of the housing 52 in a manner which will be discussed in more detail below.

Disposed within the housing 52 in relative close proximity to the inlet port 60 is a first plate 64 which is preferably perforated and fabricated from a metal material. Disposed between the first plate 64 and the inlet port 60 is a porous dust filter 66. The dust filter 66 is preferably applied directly to the first plate 64. The space defined within the housing 52 between the dust filter 66 and inlet port 60 comprises an entrance chamber 68 of the system 50. Disposed within the entrance chamber 68 adjacent the inlet port 60 is a circulating fan 70, the use of which will be discussed below.

In addition to the first plate 64, also disposed within the housing 52 below the exhaust port 62 is a second plate 72 which is also preferably fabricated from a metal material. Importantly, the separated first and second plates 64, 72 and the portions of the side walls 58 extending therebetween define a microwave cavity 74 within the housing 52 which has a preferred volume Vo. As will be described below, the microwave cavity 74 serves as the ozone producing chamber of the system 50.

Disposed within the microwave cavity 74 are a number N of ozone producing lamps 76. The lamps 76 are supported within the microwave cavity 74 by a support structure which comprises a top plate 78 disposed within the microwave cavity 74 in close proximity to the first plate 64. Disposed within the top plate 78 is a first set of openings and a first set of apertures 80. In addition to the top plate 78, the support structure comprises a bottom plate 82 which is disposed within the microwave cavity 74 in close proximity to the second plate 72, and is identically configured to the top plate 78. In this respect, the bottom plate 82 includes a second set of openings and a second set of apertures 84 disposed therein. The top and bottom plates 78, 82 are oriented within the microwave cavity 74 such that the openings of the first set (within the top plate 78) are coaxially aligned with respective openings of the second set (within the bottom plate 82). As seen in FIGS. 2 and 3, the lamps 76 are extended between respective aligned pairs of the first and second sets of openings.

As best seen in FIG. 3, the distance separating the top and bottom plates 78, 82 from each other is selected such that when the lamps 76 are extended between the aligned openings of the first and second sets, the electrical leads 86 disposed on the top ends of the lamps 76 extend into the space defined between the top plate 78 and first plate 64, with the electrical leads 86 disposed on the bottom ends of the lamps 78 extending into the space defined between the bottom plate 82 and second plate 72. The top and bottom plates 78, 82 and lamps 76 cumulatively define a lamp array which is configured to facilitate the uniform distribution of the lamps 76 within the microwave cavity 74. The top and bottom plates 78, 82 are each preferably fabricated from a dielectric, ozone resistive plastic material, such as a polyethylene or a polytetrafluoroethylene.

The inclusion of the first and second sets of apertures 80, 84 within the top and bottom plates 78, 82 facilitates the circulation of a fluid through the microwave cavity 74. As seen in FIGS. 2 and 3, the exhaust port 62 is oriented on one of the side walls 58 so as to communicate with the microwave cavity 74 between the top and bottom plates 78, 82, with the exhaust port 62 being oriented closer to the bottom plate 82. Additionally, the exhaust port 62 is preferably dimensioned so as to prevent the escape of microwaves from within the microwave cavity 74.

The ozone producing lamps 76 included in the lamp array within the microwave cavity 74 preferably include either low or medium pressure mercury lamps, excimer lamps, hydrogen lamps, or deuterium lamps. The lamps 76 each have a diameter D, a length L, and a nominal power p which is typically from 4 to 4000 watts. Additionally, the lamps 76 each include an envelope which is preferably fabricated from either quartz, sapphire, or fused silica, and is adapted to transmit ultraviolet radiation in the range of 160 nm to 200 nm. The lamps 76 used in the system 50 may also comprise hot cathode lamps (including a total of four (4) electrical leads 86), cold cathode lamps (including a total of two (2) electrical leads 86), or lamps including no electrical leads/electrodes. Those of ordinary skill in the art will recognize that lamps other than for those previously described which are capable of emitting ultraviolet radiation within a desired range may be incorporated into the system 50.

In the ozone producing system 50, the space defined within the housing 52 between the second plate 72 and bottom end 56 constitutes a power supply chamber 88. Disposed within the power supply chamber 88 is a microwave magnetron generator 90 which communicates with the microwave cavity 74 directly or via a wave guide 92 also disposed within the power supply chamber 88. In this respect, the wave guide 92 extends between the generator 90 and the second plate 72 partially defining the microwave cavity 74. The generator 90 has a microwave power P, and is adapted to produce microwaves having a wavelength $\lambda$. In particular, the generator 90 is adapted to produce microwaves having a wavelength which correspond to the ISM frequencies conforming to International Radio Regulations, and in particular frequencies in a range of from 890 mc/sec to 22250 mc/sec. To facilitate the even disbursement of microwaves within the microwave cavity 74, disposed within the space defined between the bottom plate 82 and second plate 72 is a disbursement unit 94. The disbursement unit 94 preferably comprises a fan-like blade which is rotated by fluid or by a motor (not shown) disposed within the housing 52.

To facilitate the activation of the generator 90, electrically connected thereto is a power supply 96 which is also disposed within the power supply chamber 88. The power supply 96 comprises a high voltage transformer 98 which has both a rectifier 100 and a high voltage capacitor 102 electrically connected thereto. The power supply 96 is adapted to function in a continuous wave or a repetitive pulse mode, and is preferably operated with an external power source of either 50/60 Hz AC, 400 Hz AC, 12 VDC, 24 VDC, 36 VDC, 48 VDC, or 110 VDC. Also disposed within the power supply chamber 88 of the housing 52 is a cooling fan 104 which communicates with ambient air outside of the housing 52. When activated, the cooling fan 104 is adapted to circulate air over and thus cool both the generator 90 and high voltage transformer 98 of the power supply 96. To facilitate the circulation of cooling air through the power supply chamber 88, the lower portion of at least one of the side walls 58 of the housing 52 is provided with cooling vents 106.

The housing 52 of the system 50 is preferably fabricated from metal or plastic. Additionally, the portions of the side walls 58 which partially define the microwave cavity 74 are preferably fabricated from ozone resistive metal or metal having an inner surface which includes an ozone resistive coating applied thereto. The preferred ozone resistive metal or ozone resistive coating applied to the inner surface of the metal has an electrical specific resistivity of from 2 to 80 micro ohms per centimeter. Though the microwave cavity 74 shown in FIGS. 2 and 3 is rectangularly configured, the same may alternatively be provided having a generally cylindrical configuration or an oval shape.

Importantly, in the ozone producing system 50 of the present invention, the dimensions and functional attributes of the microwave cavity 74, the lamps 76, the generator 90 and the power supply 96 are specifically selected to provide optimal operating conditions for the system 50 wherein the ultraviolet output and longevity of the lamps 76 is maximized and the system power consumption is minimized. This optimal operating condition is governed by the relationships:

$$Vo \geq Vmin\ 1 \text{ wherein } Vmin\ 1 = 8\pi\lambda^3/3 \qquad \text{[formula (1)]}$$

$$Vo \geq Vmin\ 2 \text{ wherein } Vmin\ 2 = \pi(D + 1)^2 NL/4 \qquad \text{[formula (2)]}$$

$$P = kNp \sqrt{1 + Vo/V_{min}} \qquad \text{[formula (3)]}$$

wherein V min is the larger of V min 1 and V min 2, and k is a constant with a value in the range of $0.3 \leq k \leq 3$ (low values of k are used in the case of extended lamp life time, while high values of k are used in the case of highest power and ozone production rate). In formulas (1), (2), and (3), the units for $\lambda$, D, and L are in cm; the units for Vo, V min, V min 1, and V min 2 are in cm$^3$; the units for P and p are in watts; and $\pi$=3.14.

The use of the aforementioned formulas is demonstrated in accordance with the following example:

A total number N of twenty (20) standard ozone producing low pressure mercury lamps 76 (designated as Model No. GPH-287VH) are chosen to be used within the system 50. The optimal power p for the excitation of each lamp 76 (as recommended by the manufacturer) is 14 watts. The diameter of each lamp 76 is 15 mm, with the length thereof being 25 cm. The total power P of the generator 90 should be $k \cdot 280 \sqrt{1+Vo/Vmin}$ watts. Assuming the microwave frequency to be a standard industrial frequency of 2450 MHz, in accordance with formula (1) the volume Vo of the microwave cavity should not be less than 15381 cm$^3$. Additionally, for efficient ozone production, in accordance with formula (2) Vo should not be less than $3.14 \cdot (1.5+1)^2 \cdot 20 \cdot 25/4$ or 2453 cm$^3$. V min, which is selected to be the larger of V min 1 and V min 2, is 15381 cm$^3$ (i.e., V min 1). Accordingly, Vo is selected to be 1 cu ft. (i.e., 28316 cm$^3$). For extended lamp life time, the selected value of k=0.6. As such, the power of the microwave generator P, in accordance with formula (3), should be $0.6 \cdot 280 \sqrt{1+28316/15381}$ or 283 watts. This is the optimal microwave power. The lowest acceptable power in accordance with formulas (1), (2), and (3) should not be less than 120 watts, and the highest microwave power for a reasonable size of the microwave cavity (e.g., 1 cu ft.) should not be higher than 1400 watts. The high level of ozone output will be accompanied by a very short life time of the lamps, especially hot cathode lamps such as the GPH-287VH lamps for the case of 1400 watts input microwave power. The highest level of microwave power could be selected for cold cathode or no electrode lamps, or for very large volumes of the microwave cavity for efficient short term generation of ozone with a high speed of feeding gas.

A prototype of the ozone generator described above been built by Applicant Quantum Technologies and tested in the Jelight Co. (Irvine, Calif.) with a certified ozone monitor PCI 400 HC. The generator produced ozone from ambient air with an efficiency of 10.5 gramm/kWh. This efficiency is approximately two times higher than the efficiency of prior art ozone generators built with the same type of ozone producing lamps.

Having thus described the components comprising the ozone producing system 50 of the present invention, the operation thereof will now be described. A fluid (i.e., air or pure oxygen) is drawn into the inlet port 60 by the activation of the circulating fan 70. The activation of the circulating fan 70 causes the fluid to be drawn into the entrance chamber 68 and circulated through the dust filter 66 and first plate 64. The flow of fluid through the first plate 64 is facilitated by the perforated configuration thereof.

After flowing through the first plate 64, the fluid (which is preferably air rather than pure oxygen for greater cost efficiency) enters the microwave cavity 74 and freely circulates between the top and bottom plates 78, 82 due to the inclusion of the first and second sets of apertures 80, 84 therewithin. The activation of the generator 90 causes microwaves to be transmitted into the microwave cavity 74 via the wave guide 92. The microwaves are evenly disbursed within the microwave cavity 74 by the activation of the disbursement unit 94, thus facilitating the homogenous excitation of the lamps 76. When excited/energized, the lamps 76 emit ultraviolet radiation which causes the formation of ozone within the microwave cavity 74. Due to the continuous operation of the circulation fan 70, this resultant ozone is expelled from the microwave cavity 74 via the exhaust port 62. The activation of the generator 90 is facilitated by the power supply 96, with both the power supply 96 and the generator 90 being constantly cooled by the activation of the cooling fan 104 while the system 50 is operating.

The ozone producing system 50 shown in FIGS. 2 and 3 presents numerous advantages over the prior art apparatus 10 shown in FIG. 1. In this respect, the elimination of the ballasts 38 in the system 50 allows the housing 52 thereof to be substantially reduced in size. The elimination of the ballasts 38 also substantially reduces the power consumption of the system 50, and further reduces its manufacturing costs since, in addition to the ballasts 38 being excluded, there is no need to run wire cables to interconnect the lamps to the ballasts. Moreover, the use of microwave energy to power the lamps 76 in the system 50 as an alternative to AC or DC power increases the output efficiency of the lamps 76 by up to two times, thereby further increasing the efficiency of the system 50.

Additional modifications and improvements of the present invention may also be apparent to those skilled in the art. For example, more than one generator 90 may be included in the system 50 for providing microwave energy to the microwave cavity 74. Thus, the particular combination of parts described and illustrated herein is intended to represent only one embodiment of the present invention, and is not intended to serve as limitations of alternative devices within the spirit and scope of the invention.

What is claimed is:

1. A microwave powered ozone producing system, comprising:

a housing defining a microwave cavity having a volume Vo, and inlet and exhaust ports which communicate with the microwave cavity;

a number N of ozone producing lamps disposed within the microwave cavity and uniformly distributed therewithin, each of said lamps having a diameter D, a length L, and a nominal power p;

a microwave magnetron generator in communication with the microwave cavity, said generator having a microwave power P and producing microwaves having a wavelength $\lambda$; and a power supply electrically connected to the generator;

the optimal operating condition for the system to maximize the ultraviolet output and longevity of the lamps and minimize system power consumption being governed by the relationships:

$Vo \geq V\ min\ 1$ wherein $V\ min\ 1 = 8\pi\lambda^3/3$;

$Vo \geq V\ min\ 2$ wherein $V\ min\ 2 = \pi(D+1)^2\ N\ L/4$; and $$P = kNp\sqrt{1 + Vo/V\min}$$

wherein V min is the larger of V min 1 and V min 2, k is a constant with a value in the range of $0.3 \leq k \leq 3$, and $\pi = 3.14$.

2. The system of claim 1 wherein said lamps each have a nominal power p of from 4 to 100 watts.

3. The system of claim 1 wherein said lamps are selected from the group consisting of:

low pressure mercury lamps;

medium pressure mercury lamps;

excimer lamps;

hydrogen lamps; and deuterium lamps.

4. The system of claim 3 wherein said lamps each include an envelope which is adapted to transmit ultraviolet radiation in the range of 160 nm to 200 nm.

5. The system of claim 4 wherein the envelope of each of the lamps is fabricated from a material selected from the group consisting of:

quartz;

sapphire; and fused silica.

6. The system of claim 1 wherein said lamps are selected from the group consisting of:

hot cathode lamps including four electrodes;

cold cathode lamps including two electrodes; and lamps including no electrodes.

7. The system of claim 1 wherein the lamps are supported within the microwave cavity by a support structure, comprising:

a top plate disposed within the microwave cavity, said top plate having a first set of openings and a first set of apertures disposed therein; and a bottom plate disposed within the microwave cavity in spaced relation to the top plate, said bottom plate including a second set of openings and a second set of apertures disposed therein;

the top and bottom plates being oriented within the microwave cavity such that the openings of the first set are coaxially aligned with respective openings of the second set, said lamps being extended between respective aligned pairs of the openings, with the first and second sets of apertures being used to facilitate the circulation of a fluid through the microwave cavity.

8. The system of claim 7 wherein the top and bottom plates are each fabricated from a dielectric, ozone resistive plastic material.

9. The system of claim 1 wherein the microwave cavity is defined by:

a first plate disposed within the housing;

a second plate disposed within the housing in spaced relation to the first plate; and a side wall portion of the housing extending between the first and second plates;

said inlet port communicating with the first plate and said exhaust port communicating with the side wall portion of the housing.

10. The system of claim 9 wherein the exhaust port is dimensioned so as to prevent the escape of microwaves from within the microwave cavity.

11. The system of claim 9 wherein the first plate is perforated to facilitate the flow of a fluid from the inlet port into the microwave cavity, and to prevent the escape of microwaves from within the microwave cavity.

12. The system of claim 11 further comprising a dust filter disposed within the housing between the inlet port and the first plate.

13. The system of claim 9 further comprising:

a circulation fan disposed within the housing between the first plate and the inlet port for facilitating the passage of a fluid from the inlet port into the microwave cavity.

14. The system of claim 9 wherein the generator communicates with the microwave cavity via a wave guide.

15. The system of claim 14 wherein the wave guide extends between the generator and the second plate, and the generator and the wave guide are disposed within the housing.

16. The system of claim 1 wherein the power supply comprises:

a high voltage transformer;

a rectifier electrically connected to the transformer; and a high voltage capacitor electrically connected to the transformer.

17. The system of claim 16 further comprising a cooling fan for cooling the generator and the high voltage transformer.

18. The system of claim 17 wherein the power supply, the generator, and the cooling fan are disposed within the housing.

19. The system of claim 9 wherein the side wall portion of the housing defines an inner surface having an ozone resistive coating applied thereto.

20. The system of claim 19 wherein the ozone resistive coating has an electrical specific resistivity of from 2 to 80 micro ohms per centimeter.

21. The system of claim 1 wherein said housing is fabricated from a material selected from the group consisting of:

metal; and plastic.

22. The system of claim 1 further comprising a microwave disbursement unit disposed within the microwave cavity for evenly disbursing microwaves therewithin.

23. The system of claim 1 wherein said microwave cavity has a generally rectangular configuration.

24. The system of claim 1 wherein said microwave cavity has a generally cylindrical configuration.

25. The system of claim 1 wherein the power supply is adapted to function in a repetitive pulse mode.

26. The system of claim 1 wherein the microwave magnetron generator is adapted to produce microwaves having a wavelength selected from the group consisting of:

915 mc/sec+or−25 mc/sec;

2450 mc/sec+or−50 mc/sec;

5800 mc/sec+or−75 mc/sec; and 22125 mc/sec+or−125 mc/sec.

27. The system of claim 1 wherein said power supply is operated with an external power source selected from the group consisting of:

50/60 Hz AC;

400 Hz AC;

12 VDC;

24 VDC;

36 VDC;

48 VDC; and

110 VDC.

28. The system of claim 8 wherein the plastic material is selected from the group consisting of:

polyethylenes; and polytetrafluoroethylenes.

29. The system of claim 1 wherein the generator is directly connected to the microwave cavity.

30. The system of claim 21 wherein the housing is fabricated from ozone resistive metal having an electrical specific resistivity of from 2 to 80 micro ohms per centimeter.

31. A method of producing ozone, comprising the steps of:

a) providing a housing defining a microwave cavity having a volume Vo, and inlet and exhaust ports which communicate with the microwave cavity;

b) uniformly distributing a number N of ozone producing lamps within the microwave cavity, with each of the lamps having a diameter D, a length L, and a nominal power p;

c) placing a microwave magnetron generator into communication with the microwave cavity, the generator having a microwave power P and producing microwaves having a wavelength λ;

d) electrically connecting a power supply to the generator;

e) circulating a fluid through the microwave cavity via the inlet and exhaust ports; and f) maximizing the ultraviolet output and longevity of the lamps and minimizing system power consumption by selecting the dimensions and functional attributes of the microwave cavity, the lamps and the generator in accordance with the relationships:

$Vo \geq V$ min 1 wherein $V$ min $1 = 8\pi\lambda^3/3$;

$Vo \geq V$ min 2 wherein $V$ min $2 = \pi(D+1)^2 \, N \, L/4$; and $$P = kNp \sqrt{1 + Vo/V\min}$$

wherein $V$ min is the larger of $V$ min 1 and $V$ min 2, and $k$ is a constant with a value in the range of $0.3 \leq k \leq 3$, and $\pi = 3.14$.

32. The method of claim 31 wherein step (e) comprises circulating pure oxygen through the microwave cavity.

33. The method of claim 31 wherein step (e) comprises circulating air through the microwave cavity.

34. A system for powering at least one lamp using microwaves, comprising:

a housing defining a microwave cavity having a volume Vo;

a number N of ozone producing lamps disposed within the microwave cavity and uniformly distributed therewithin, each of said lamps having a diameter D, a length L, and a nominal power p;

a microwave magnetron generator in communication with the microwave cavity, said generator having a microwave power P and producing microwaves having a wavelength $\lambda$; and a power supply electrically connected to the generator;

the optimal operating condition for the system to maximize the ultraviolet output and longevity of the lamps and minimize system power consumption being governed by the relationships:

$Vo \geq V$ min 1 wherein $V$ min $1 = 8\pi\lambda^3/3$;

$Vo \geq V$ min 2 wherein $V$ min $2 = \pi(D+1)^2 \, N \, L/4$; and $$P = kNp \sqrt{1 + Vo/V\min}$$

wherein $V$ min is the larger of $V$ min 1 and $V$ min 2, and $k$ is a constant with a value in the range of $0.3 \leq k \leq 3$, and $\pi = 3.14$.

* * * * *

UNITED STATES PATENT AND TRADEMARK OFFICE
CERTIFICATE OF CORRECTION

PATENT NO. : 5,666,640
DATED : September 9, 1997
INVENTOR(S) : Vladimir A. Danilychev It is certified that error appears in the above-identified patent and that said Letters Patent is hereby corrected as shown below:

Item [19] & [76]

Please change the spelling of the Inventor's name in all instances to:

Vladimir A. Danilychev

Signed and Sealed this

Twenty-fourth Day of March, 1998

Attest:

BRUCE LEHMAN

Attesting Officer    Commissioner of Patents and Trademarks